May 17, 1932. A. N. MERLE 1,858,792
FILM COUNTER FOR CINEMATOGRAPHIC VIEW TAKING APPARATUS
Filed Feb. 17, 1928 2 Sheets-Sheet 1
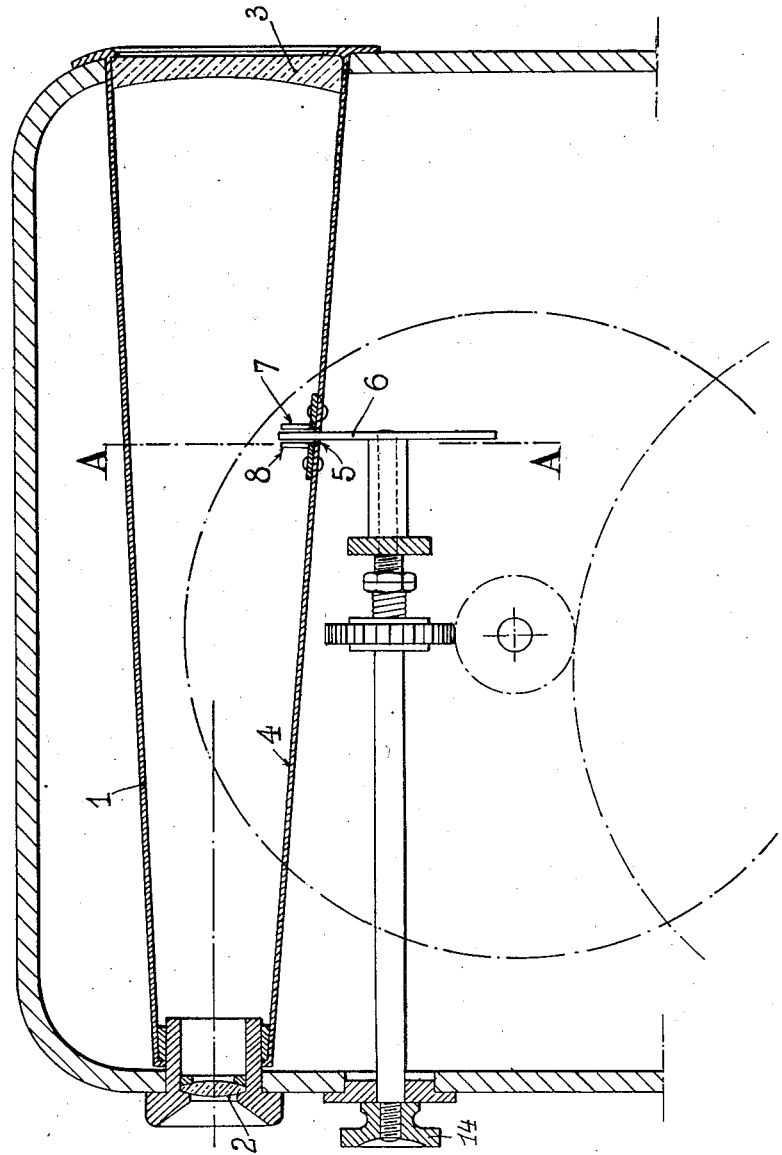
André Noël Merle
INVENTOR May 17, 1932.  A. N. MERLE  1,858,792
FILM COUNTER FOR CINEMATOGRAPHIC VIEW TAKING APPARATUS
Filed Feb. 17, 1928   2 Sheets-Sheet 2
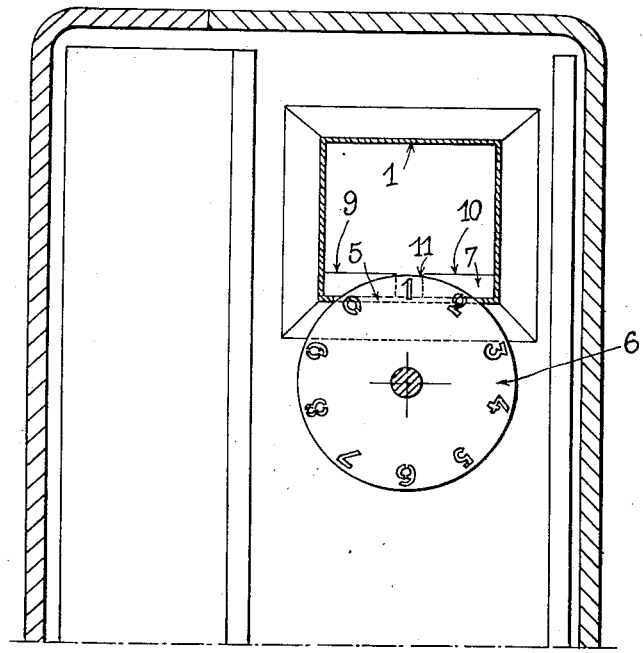
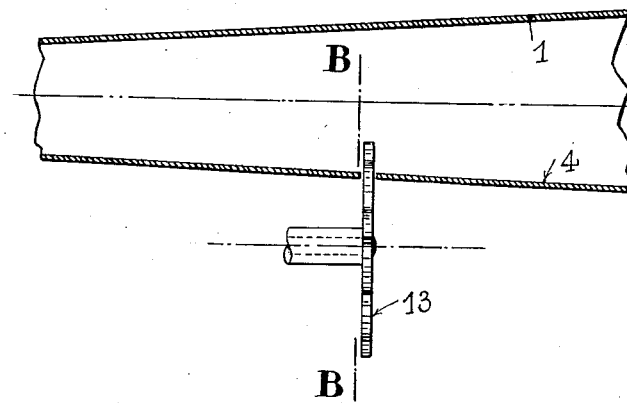
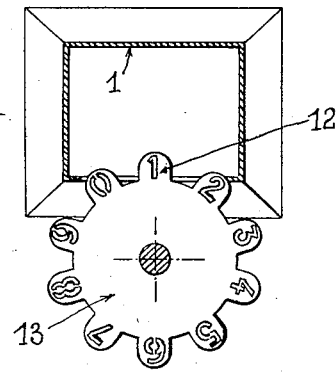
André Noël Merle
INVENTOR
his Atty.

Patented May 17, 1932

1,858,792

UNITED STATES PATENT OFFICE

ANDRÉ NOËL MERLE, OF VINCENNES, FRANCE, ASSIGNOR TO PATHÉ CINÉMA, ANCIENS ÉTABLISSEMENTS PATHÉ FRERES, OF PARIS, FRANCE

FILM-COUNTER FOR CINEMATOGRAPHIC VIEW-TAKING APPARATUS

Application filed February 17, 1928, Serial No. 255,030, and in France December 2, 1927.

When taking cinematographic views with a hand camera and particularly with an automatic camera, the scene to be taken is followed by means of the finder of the apparatus. For this purpose, the eye must be placed upon the eye-piece, and it is impossible in this case to follow the movement of the counter which indicates the length of the film travelling before the lens.

The present invention relates to a cinematographic view-taking camera which is chiefly characterized by the fact that the disc of the film counter is caused to enter the field of the finder, whereby the above-mentioned defect will be obviated, since the counter can be read and the finder employed at the same time.

In the appended drawings, which are given solely by way of example:

Fig. 1 is a longitudinal section of a finder placed in the chamber containing the mechanism, and according to the invention, the disc of the film counter is caused to enter the field of the finder.

Fig. 2 is a cross section on the line A—A of Fig. 1.

Figs. 3 and 4 are respective modifications of Figs. 1 and 2 as concerns the form of the numbered disc of the film counter.

In the constructional form shown in Figs. 1 and 2, the chamber 1 of the finder comprises at one end the eye-piece lens 2 and at the other end the objective lens 3. At the lower part of said chamber is a slot 5 for the insertion of the graduated disc 6 of the counter which is driven by the mechanism. I employ a rectangular plate which as shown in Fig. 1 may consist of two angle bars 7 and 8 between which the disc 6 is rotatable; said plate limits the field of the finder according to the line 9—10 which is tangent to the disc. The said plate is cut out on the dotted line (Fig. 2) around the number, so that the resulting notch is the only part left free under the line 9—10, and this will permit of the reading of the number representing the length of the film when this number coincides with the said notch. As shown in Fig. 2, the number 1 will be read in the position corresponding to this figure.

The internal graduated disc 6 of the counter is obviously connected by the actuating shaft with the outer disc 14 of the counter, so that the numbers on these two discs will always be in coincidence.

Figs. 3 and 4 show a modification of my said apparatus in which I am enabled to eliminate the said plate and to employ an objective lens 3 of smaller size than the one shown in Figs. 1 and 2. The numbers of the counter are placed upon the projections 12 (Fig. 4) of the disc 13. The angle formed at the centre by the axes of two consecutive projections is sufficient in practice to allow only one of these numbered projections to be visible.

In all cases, the numbers are preferably perforated in the disc so that they will be distinctly visible in the finder.

Obviously, the said invention is not limited to the construction herein described, this being given solely by way of example. In particular, the counter numbers may be caused to appear in one of the corners of the finder. The numbers need not be perforated and may be formed by cut-out vignettes.

Having now described my invention, what I claim as new and desire to secure by Letters Patent is:

1. In a cinematographic view taking apparatus, a film feeding mechanism, a finder comprising an eye-piece lens and an objective lens, a movable member provided with a graduated scale projecting partially in the field of said finder and adapted to bring successively all the portions of said scale in the field of said finder, a driving mechanism and gearing means between said driving mechanism and said film feeding mechanism and between said driving mechanism and said graduated member adapted to impart proportional speeds to said film feeding mechanism and to said graduated member, whereby it is possible to see at every instant through the finder the scenes to be photographed and the length of the film which has been exposed.

2. In a cinematographic view taking apparatus, a film feeding mechanism, a finder comprising an eye-piece lens and an objective lens, a rotatable disc provided at its periphery with a graduated scale projecting partially in the field of said finder and adapted to bring successively all the portions of said scale in the field of said finder, a driving mechanism and gearing means between said driving mechanism and said film feeding mechanism and between said driving mechanism and said graduated disc adapted to impart proportional speeds to said film feeding mechanism and to said graduated disc, whereby it is possible to see at every instant through the finder the scenes to be photographed and the length of the film which has been exposed.

3. In a cinematographic view taking apparatus, a film feeding mechanism, a finder comprising an eye-piece lens and an objective lens, a movable member provided with a graduated scale projecting partially in the field of said finder and adapted to bring successively all the portions of said scale in the field of said finder, a driving mechanism, gearing means between said driving mechanism and said film feeding mechanism and between said driving mechanism and said graduated member adapted to impart proportional speeds to said film feeding mechanism and to said graduated member and partition disposed in the field of the finder and provided with an aperture adapted to allow only one graduation number to be seen on said graduated member, whereby it is possible to see at every instant through the finder the scenes to be photographed and the length of the film which has been exposed.

4. In a cinematographic view taking apparatus, a film feeding mechanism, a finder comprising an eye-piece lens and an objective lens, a movable member projecting partially in the field of said finder provided with perforated numbers and adapted to bring successively all the perforated numbers in the field of said finder, a driving mechanism and gearing means between said driving mechanism and said film feeding mechanism and between said driving mechanism and said numbered member adapted to impart proportional speeds to said film feeding mechanism and to said numbered member.

In testimony whereof I have signed my name to this specification.

ANDRÉ NOËL MERLE.